United States Patent Office 2,820,711
Patented Jan. 21, 1958

2,820,711
COMBINED STAIN AND FILLER, AND DRYING OIL THEREFOR

Myron W. Kiebler, Jr., Cleveland, and Richard Baukema, Lakewood, Ohio, and Albert Zier, Chicago, Ill., assignors to The Glidden Company, Cleveland, Ohio, a corporation of Ohio No Drawing. Application June 22, 1953
Serial No. 363,396

12 Claims. (Cl. 106—34)

This invention relates to a novel composition of matter particularly adapted for use as a combined stain and filler.

A combined stain and filler for wood (and other porous surfaces), particularly a mahogany stain and filler, has long been sought as a means for speeding up the finishing of wood and thereby reducing the costs of such operations. Various products have been proposed and/or provided as a solution to this problem, but to the best of our knowledge, none of the proposals or products has yet been entirely satisfactory. A combined stain and filler should have the following capabilities:

(1) It should not raise the grain of wood to which it is applied;

(2) It should give a clear, clean color rather than a cloudy or muddy appearance;

(3) It should have suitable drying characteristics to enable it to be used according to the various production methods encountered in the furniture and other wood-finishing industries;

(4) It should not cause uneven or streaked coloring of the surface to which it is applied;

(5) In the reduced (as applied) state, it should not undergo separation of the liquid components from the solids therein when a mass thereof is allowed to stand at least 8 hours in a suitable container; moreover when separation does occur after long standing, a simple mixing or stirring should restore it readily to a smooth mass;

(6) The concentrated stain-filler should not develop a skin on its surface when a mass thereof in a container is exposed to the air continuously for as long as eight hours;

(7) It should fill the pores of a surface solidly rather than filling them with a spongy, porous mass of filling solids, and should not shrink on drying;

(8) It should have a stable color over periods as long as six months so that a furniture factory, for example, can stock a reasonable supply thereof for future use, with assurance that the color will not change during such storage;

(9) It should not be difficult to apply nor require such unusual handling or treatment as to necessitate its use only by specially-trained personnel;

(10) The filled surface should not blister nor the filler lift when a mild lacquer sealer is applied to the filled surface.

We have now found that combined stains and fillers can be prepared as described hereinafter to possess all of the foregoing qualities.

Accordingly, it is an object of this invention to provide a novel composition of matter particularly adapted for use as the principal film-forming material in a combined stain and filler.

It is a further object to provide an improved combined stain and filler having the qualities enumerated above.

It is another object to provide novel processes for preparing the foregoing composition of matter and the improved combined stains and fillers.

These and other objects will be apparent from the following description of the invention.

It will be understood by those skilled in the art that the combined stains and fillers of the present invention are paste-like products containing: (a) "inert" solids, with or without color pigments, which function to fill the pores and other minute inequalities in the surface; (b) water-soluble dyes which stain the surface to the desired color; these dyes are light-resistant and do not rot finish coats applied to a filled surface containing them; (c) one or more film-forming materials which on drying function to bind the "inert" solids together and to the surface to which they have been applied, and which additionally provide a protective coating over the stain-and-filler surface as a whole; and (d) one or more solvents to unite the foregoing classes of ingredients into an easy-working, stable product. Other ingredients can be included to modify one or more properties of the product or one or more functional attributes of the component parts of the product. Such latter ingredients include resins, driers, coupling agents, water and/or organic solvents having the property of dissolving the dyes to at least some extent or of assisting in their complete dissolution, and various solids and/or liquids which function to alter the rheological properties of the composition of matter as a whole.

The "inert" fillers of the invention include such conventional materials as gypsum, silica, asbestine, hydrated calcium silicate, calcium carbonate, and colored pigments and/or toning pigments used in addition to impart such color as may be needed to adapt the finished composition to the color of finish being sought.

For the most part, present-day non-grain-raising stains utilize water-soluble dyes and such dyes are used in this invention. The advantages accruing from their use are well-known in the art, but for purposes of reference, U. S. Patents Nos. 2,338,149, 2,628,206 and 2,628,947 illustrate their use in combined stains and fillers. The water-soluble dyes employed are of course selected to give the color of stain which is wanted.

The film-forming material of the present invention comprises linseed oil which has been modified so as to possess limited solubility in water. Minor amounts of varnish resins can be used therewith if desired to increase the hardness of the resulting film and/or to modify other properties thereof. The process by which the moderately-soluble linseed oil is prepared involves heating raw or alkali-refined linseed oil with a small amount of maleic anhydride and/or maleic or fumaric acid to prepare an acidic adduct (see Clocker Patents 2,188,882 through 2,188,893 and 2,275,843), cooling the resulting mass to below about 110° F., agitating it with aqueous ammonia to neutralize the acidity partially, and then as a matter of preference adding with agitation a small amount of an aqueous solution of 2-amino-2-methyl-1,3-propanediol. By using suitable amounts of maleic anhydride and/or acid, and of ammonia, with or without the propanediol, the resulting product can be so altered in its water-solubility characteristics as to form a clear solution with a small amount of water and to be dispersible in a large amount of water. When an ethylene glycol lower mono-alkyl ether is added to such a dispersion, the oil adduct dissolves completely and a clear aqueous solution results.

The following example illustrates the preparation of a film-forming material of such characteristics:

EXAMPLE 1

Twelve hundred pounds of alkali-refined raw linseed oil was mixed with 104 pounds of maleic anhydride in a kettle under an atmosphere of carbon dioxide, and while so protected the mixture was agitated continuously while being heated to 400° F. The mass was then held at this temperature for 1.5 hours under carbon dioxide while being stirred, and then was allowed to cool under carbon dioxide. The resulting product had an acid number of 90 and a color of 2–L. When the oil had cooled to about 110° F., 78 pounds of ammonia in the form of a 28% (wt.) aqueous solution was added slowly with good agitation. After all of the ammonia had been added, 2.5 pounds of 2-amino-2-methyl-1,3-propanediol dissolved in 1.5 pounds of water was added and thoroughly mixed therewith. The resulting mass was a clear, single-phase liquid product not soluble in water directly, but after being mixed with a small amount of an ethylene glycol lower monoalkyl ether (e. g., monomethyl, ethyl, propyl or butyl) large quantities of water could be added to give a homogeneous, single-phase system. The product had an acid number of 52 (corresponding to about 63% neutralization of the adduct's original acidity), a color of 1–2L, a non-volatile content of 94.5%, and was capable of air-drying in thin films in about 3 hours to give water-resistant, adherent coatings. One gallon weighed 8.15 pounds.

Oil adducts of comparable characteristics can be prepared within the following limits as to type and amount of raw materials:

| | Percent |
|---|---|
| Linseed oil (raw, alkali-refined, and/or bleached) by weight | 91–94 |
| Maleic acid and and/or maleic anhydride and/or fumaric acid | 6–9 |
| Ammonia—an amount sufficient to neutralize 40–70% of the acidity of the oil adduct. | |
| 2-amino-2-methyl-1,3-propanediol | 0–2 |

The ammonia can be anhydrous or aqueous, and the concentration of ammonia in the aqueous solution thereof can be at any desired level. However, where very dilute aqueous ammonia is used, so much water may be introduced during neutralization that the resulting product will not be a clear solution at any stage until a glycol ether has been added in appropriate amount. Moreover, the total water introduced by the ammonia should not, of course, exceed the total water which is desired in the finished combined stain-filler. We prefer to use aqueous ammonia containing around 28% NH₃ by weight.

As we have indicated above, the propanediol is an optional neutralizing component and can be omitted. However, we prefer to add a small amount up to 2% in order to secure smoother films from the partially-neutralized adduct. The propanediol also possesses some other surface-active properties which are beneficial in the finished combined stain-fillers.

In respect to the use of ethylene glycol monoalkyl ethers to produce clear aqueous solutions of the oil adduct, it should be noted that any one of the four ethers from monomethyl to monobutyl can be used individually. Mixtures of these ethers can be used also, but mixtures of monomethyl and monoethyl have been found to give better results in our stain-fillers than do other mixtures. Oil adducts prepared within the limits described above yield clear solutions with any one of the ethers, and all of such adducts are satisfactory for use in our combined stain fillers. The adducts have other uses as well, however, as in emulsion coatings where they appear to impart body to the emulsion and to delay drying sufficiently to permit additional working, brushing, etc. The adducts also can be used in pigmented wiping stains.

Complete neutralization of the acid-oil adduct should be avoided, as we have indicated above. When more than about 70% of the acidity is neutralized with ammonia, films cast therefrom are very water sensitive. We have found that neutralization to an extent between 40% and 70% provides a film-forming material which dries well and yet is not water sensitive, and which can be compounded with the other ingredients of combined stain-fillers to give a stained and filled finish which will not blister when mild, non-lifting sealing coats of lacquer are applied thereto. We have found that such blistering is quite definitely related to some as yet unknown qualities of the film-forming material, and that when adducts are prepared which do not correspond in composition to the limits stated hereinabove, blistering is encountered. Thus, it will be understood that while various oil-acid adducts can be prepared which may dry satisfactorily and which are reasonably non-water-sensitive, one cannot be sure that such adducts can be used satisfactorily in a combined stain-filler. Consequently, the suitability in combined stain-fillers of adducts such as are described in the Clocker patents supra must be determined finally by putting such adducts in stain-filler formulations, then applying the resulting stain-fillers to wood, drying the stained and filled surface, and finally applying a sealer thereto. By means of such tests we have discovered that the adducts formulated as set forth above, and partially neutralized to the extent indicated are eminently satisfactory for use as the film-forming materials in combined stain-fillers. Moreover, we have discovered that such adducts are either directly or indirectly responsible for other outstanding performance qualities of the stain-fillers, such as uniform staining action; color stability over long periods of time; dense packing of the filler in pores of the filled wood; clear, clean color in the stained and filled wood; easy working; etc.

The following examples illustrate the preparation of combined stain-fillers utilizing film-forming adducts of the types described above, and the beneficial function therein of the linseed-oil adducts are thereafter pointed out more particularly.

EXAMPLE 2

*Walnut stain-filler*

| | Lbs. |
|---|---|
| Neutral solids (fillers): | |
| Amorphous silica | 2.375 |
| Crystalline silica | 2.625 |
| Asbestine | 2.00 |
| Gypsum | 2.00 |
| Total | 9.00 |
| Coloring solids: | |
| Brown toner (lake-type pigment) | .125 |
| Burnt umber | .500 |
| Bone black | .125 |
| Burnt sienna | .125 |
| Total | .875 |
| Gelling agent (optional): | |
| Organic deriv. of montmorillonite (Nat'l Lead Co.'s Bentone 18) | .125 |
| Vehicle: | |
| Suspending paste (30% N. V.)[1] | .595 |
| Treated oil of Example 1 | .764 |
| Litharge | .094 |
| Maleic mod. ester gum resin solution (60% N. V.)[2] | .27 |
| Total | 1.723 |

[1] 18 gal. kauri gum japan drier — 3¾ gal.; Lead, manganese, cobalt linoleates — ⅝ gal.; Mineral spirits — A. N.–15.0. Weight 7.27 lbs./gal.; A. N.–15.0.
[2] Acid number of resin 35–40; melting point 143°–145° C.; in mineral spirits as solvent.

The foregoing ingredients were placed in a mixer in the order stated and mixed thoroughly. Meanwhile a dye solution was prepared from the following materials:

| | Lbs. |
|---|---|
| Water | .435 |
| Yellow-brown water-soluble dye | .125 |
| Green water-soluble dye | .0039 |
| Blue-black water-soluble dye | .125 |
| Total | .7089 |

The dye solution was added to the batch in the mixer and was thoroughly mixed therewith. The container in which the dye solution had been prepared was rinsed out with .435 lb. ethylene glycol monomethyl ether, and then the rinse liquor was added to the batch in the mixer, and was thoroughly mixed therewith. The addition of the rinse liquor caused the batch to puff up considerably and to exhibit improved stability. Ethylene glycol monoethyl ether can be substituted for the methyl ether to cause the same beneficial puffing effect, and mixtures of the ethers can be used.

The stain-filler so prepared weighs 12.75 pounds, has a bulk of about one gallon, and is a concentrated product adapted for shipping and for storage until wanted. In order to prepare the product for application to wood, it should be reduced at the rate of 9–10 pounds of the concentrate to 64 liquid ounces of varnish maker's and painter's naphtha plus 64 liquid ounces of the following solvent mixture:

| | Liq. oz. |
|---|---|
| Ethylene glycol monobutyl ether | 8 |
| Diethylene glycol monoethyl ether | 2 |
| Diacetone alcohol | 8 |
| Toluol | 30 |
| High flash coal tar naphtha | 16 |
| Total | 64 |

The first three materials of this five-solvent mixture are partial solvents for the dyes and are responsible in part for bringing out a clear, non-muddy color. After reduction, the stain-filler can be sprayed, brushed or otherwise applied, padded in, and then dried. The above formulation is adapted for drying in an oven in 70 minutes at 130° F., but it can also be allowed to air-dry overnight. For overnight drying, the high flash naphtha in the five-solvent mixture can be replaced with VM and P naphtha.

After the applied stain-filler has been suitably dried, mild lacquer sealers with ester-type solvents can be applied thereover without encountering blistering or any other harmful or undesired reactions.

EXAMPLE 3

A mahogany stain-filler analogous to the above walnut stain-filler can be prepared in the same way by employing the following formulation:

Neutral solids:

| | Lbs. |
|---|---|
| Amorphous silica | 2.25 |
| Crystalline silica | 2.625 |
| Asbestine | 1.61 |
| Gypsum | 1.61 |
| Total | 8.095 |

Coloring solids:

| | |
|---|---|
| Burnt umber | .687 |
| Burgundy lake | .358 |
| Intenso carbon black | .0078 |
| Total | 1.0529 |

Gelling agent:

| | |
|---|---|
| Organic deriv. of montmorillonite (Nat'l Lead Co.'s Bentone 18)[1] | .125 |

Vehicle:

| | |
|---|---|
| Suspending paste as in Example 2 | .63 |
| Treated oil of Example 1 | .895 |
| Total | 1.525 |

Dye solution:

| | |
|---|---|
| Water | .85 |
| Orange water-soluble dye | .07 |
| Yellow water-soluble dye | .035 |
| Red water-soluble dye | .214 |
| Yellow-brown water-soluble dye | .055 |
| Blue-black water-soluble dye | .008 |
| Total | 1.232 |

Rinse liquor:

| | |
|---|---|
| Ethylene glycol monomethyl ether | 0.50 |

[1] Optional; may be omitted.

The resulting mahogany stain-filler concentrate weighs 12.4 pounds, can be reduced with the same solvents and in the proportions given in Example 2, and can be similarly applied, dried and sealed.

The following example illustrates a mahogany stain-filler which does not need the five-solvent mixture of Examples 2 and 3. It can be reduced with VM and P naphtha alone.

EXAMPLE 4

Neutral solids:

| | |
|---|---|
| Amorphous silica filler | 2.375 lbs. |
| Crystalline silica filler | 2.375 lbs. |
| Asbestine filler | 2.75 lbs. |
| Gypsum filler | 1.75 lbs. |
| Total | 9.250 lbs. |

Coloring solids:

| | |
|---|---|
| Burnt umber | .435 lbs. |
| Bone black | .11 lbs. |
| Brown toner (lake-type pigment) | .11 lbs. |
| Burnt sienna | .11 lbs. |
| Total | .765 lbs. |

Gelling agent (optional):

| | |
|---|---|
| Nat'l Lead Co.'s "Bentone No. 34" or Troy Chemical Co.'s "Troykyd Anti-settle" | .11 lbs. |

Vehicle:

| | |
|---|---|
| Litharge (drier) | .11 lbs. |
| Treated oil of Example 1 | 1.02 lbs. (16 oz. liq.) |
| Maleic treated ester gum resin solution [1] (60% N. V.) | .39 lbs. (5.375 oz. liq.) |
| Lead, manganese, cobalt, linoleates in mineral spirits solution, as suspending base (48% N. V.) | .26 lbs. (4.5 oz. liq.) |
| Japan drier (25% N. V.) weighing 6.82 lbs./gal | .08 lbs. (6 oz. liq.) |
| Mineral spirits | .355 lbs. (7 oz. liq.) |
| Total | 2.215 lbs. |

[1] Resin: Acid number 35–40, melting point 143°–145° C. Solvent: Xylol.

The foregoing materials were added to a mixer in the order stated, and were thoroughly mixed together. A dye solution was prepared from the following materials:

| | |
|---|---|
| Diacetone alcohol | .418 lbs. (7 oz. liq.) |
| Diethylene glycol monoethyl ether | .35 lbs (5.25 oz. liq.) |
| Water | .455 lbs. (7 oz. liq.) |
| Orange water-soluble dye | .28 lbs. |
| Yellow-brown water-soluble dye | .14 lbs. |
| Red water-soluble dye | .18 lbs. |
| Total | 1.823 lbs. |

The combined stain-fillers of the examples and of any of the modified formulations mentioned above give solid, tight packings in the pores of the wood, give even staining of the wood, do not raise the grain and can be handled in factories in the customary and conventional manners. Moreover, the combined stain-fillers have excellent color stability on aging for six months or longer, exhibit no separation of vehicle from solids on standing, and will not skin over in two weeks when the container is left open to the ambient atmosphere.

In general, our combined stain-fillers in the concentrated state comprise the following components and proportions:

| | |
|---|---|
| Partially-neutralized linseed oil adduct, on NVM basis | 1 part. |
| Inert solids (filler solids with or without coloring solids) | 10–14 parts. |
| Water | .5–1 part. |
| Ethylene glycol monoalkyl ether of 1–4 carbons or mixtures of the monomethyl and monoethyl ethers | .46–1.5 parts. |
| Dissolved water-soluble dyes | As needed to provide desired color. |
| Drier solids | .2 to about .4 part. |
| Volatile, compatible organic solvents other than the ethylene glycol monoalkyl ether components | As needed to give a paste-like mass capable of being further reduced at the rate of 7–14 lbs. of paste per gallon of added solvent. |

In the filler art it is conventional to prepare concentrated products which can be brought to desired spreading and working qualities by thinning 7–14 pounds of the concentrated product with one gallon of volatile organic solvent. Our combined stain-fillers are intended to conform to the above convention and the foregoing examples are in keeping therewith, all being reducible preferably at the rate of 9–10 pounds of paste per gallon.

In summary, we point out that the use of our water-tolerant linseed oil adduct in our stain-fillers appears to be responsible in large measure for numerous unexpected improvements in the performance of the stain-fillers. For example, the water-tolerant adduct appears to cooperate with the aqueous solution of dyestuffs to prevent grain-raising and to stabilize the aqueous dye solution against segregation in the reduced stain-filler. The latter is believed to account for the uniform staining action which our stain-filler gives. Moreover, at the time the reduced stain-filler is applied to wood, it appears that the water-tolerant oil and the dissolved dyes function as a single, homogeneous phase in which the dye is completely mobile and hence is not hindered by the oil in contacting the wood which is to be stained. This unhindered availability of the dyestuff is believed to be responsible at least in part for securing good depth of color in the stained wood and for securing clear colors. Such unhindered availability of the dyestuffs in our stain-fillers is in sharp contrast with prior stain-fillers using water-immiscible film-forming materials since in such stain-fillers the aqueous dye phase appears to form droplets of an internal water-phase wholly surrounded by the oil. The dye is hence hindered from reaching the wood which is to be stained in sufficient quantity to give uniform color. Moreover, the internal droplets of dye solution appear to function as color pigment in the dry filled surface, thereby yielding a muddy or greyed appearance to the surface. Furthermore, the segregation of the aqueous dyestuff into internal droplets in the oil phase may account also for the poor color retention observed in the prior art fillers when stored for some time after preparation. Contrarily, the mobility of the dyestuff in our oil-water phase is believed to explain why our stain-filler compositions can be stored for six months or longer without losing their ability to stain wood to the same color that they stain that wood immediately after their preparation.

The foregoing explanations are offered to give persons skilled in the art the benefit of such insight as we have so far been able to secure by observing the performance qualities of our stain-fillers. It should be recognized, however, that our explanations are difficult to prove rigidly because of the complexity of stain-filler compositions, and hence that we should not be bound by such explanations.

Having described our invention what we claim is:

1. A partially-neutralized linseed oil-alpha,beta unsaturated dicarboxylic-acid condensation product resulting from (a) the chemical condensation of from 6 to 9 parts of an alpha,beta-unsaturated dicarboxylic acid selected from the group consisting of maleic acid, maleic anhydride, fumaric acid, and mixtures thereof, with a complementary amount of from 94 to 91 parts of a linseed oil product selected from the group consisting of raw linseed oil and alkali-refined linseed oil, and (b) the neutralization with ammonia of from 40 to 70 percent of the resulting acidity of said condensation product, said partially-neutralized condensation product being characterized: (A) by its ability to form a clear aqueous solution when one part by weight of the solids of said condensation product is mixed with about one-fourth part by weight of ethylene glycol monobutyl ether and with a total of about three-fourths part of water by weight, and (B) by its ability to form a dry, adherent, non-water-sensitive, protective film when a coating of an aqueous solution as defined in (A) above is applied to a non-porous surface and allowed to dry.

2. A partially neutralized condensation product as claimed in claim 1 which includes up to 2% of 2-amino-2-methyl-1,3-propanediol.

3. A partially neutralized condensation product as claimed in claim 1 wherein the alpha,beta-unsaturated acid is maleic anhydride in an amount of about eight parts thereof to 92 parts of linseed oil product.

4. A partially neutralized condensation product as claimed in claim 3 which includes up to 2% of 2-amino-2-methyl-1-3-propanediol.

5. A partially neutralized condensation product as claimed in claim 1 wherein the acidity has been neutralized with ammonia to an extent of about 63%.

6. A partially neutralized condensation product as claimed in claim 5 which includes up to 2% of 2-amino-2-methyl-1,3-propanediol.

7. A combined stain-filler consisting essentially of: a condensation product as claimed in claim 1 and the following materials in percentage by weight on the solids of said condensation product; water in an amount of from about 50% to 100%; an ethylene glycol monoalkyl ether component selected from the group consisting of the monomethyl, monoethyl, monopropyl and monobutyl ethers, and mixtures thereof; said glycol ether component being present in an amount of about 46% to 150%; drier solids in an amount between about 20% and 40%; inert filler solids in an amount between about 1000% and 1400%; and dissolved water-soluble dyestuff.

8. A combined stain-filler consisting essentially of: a condensation product as claimed in claim 2 and the following materials in percentage by weight on the solids of said condensation product; water in an amount of from about 50% to 100%; an ethylene glycol monoalkyl ether component selected from the group consisting of the monomethyl, monoethyl, monopropyl and monobutyl ethers, and mixtures thereof, said glycol ether component being present in an amount of about 46% to 150%; drier solids in an amount between about 20% and 40%; inert filler solids in an amount between about 1000% and 1400%; and dissolved water-soluble dyestuff.

9. A combined stain-filler consisting essentially of: a condensation product as claimed in claim 3 and the following materials in percentage by weight on the solids of said condensation product; water in an amount of from about 50% to 100%; an ethylene glycol monoalkyl ether component selected from the group consisting of the monomethyl, monoethyl, monopropyl and monobutyl ethers, and mixtures thereof, said glycol ether component being present in an amount of about 46% to 150%; drier solids in an amount between about 20% and 40%; inert filler solids in an amount between about 1000% and 1400%; and dissolved water-soluble dyestuff.

10. A combined stain-filler consisting essentially of: a condensation product as claimed in claim 4 and the following materials in percentage by weight on the solids of said condensation product; water in a amount of from about 50% to 100%; an ethylene glycol monoalkyl ether component selected from the group consisting of the monomethyl, monoethyl, monopropyl and monobutyl ethers, and mixtures thereof, said glycol ether component being present in an amount of about 46% to 150%; drier solids in an amount between about 20% and 40%; inert filler solids in an amount between about 1000% and 1400%; and dissolved water-soluble dyestuff.

11. A combined stain-filler consisting essentially of: a condensation product as claimed in claim 5 and the following materials in percentage by weight on the solids of said condensation product; water in an amount of from about 50% to 100%; an ethylene glycol monoalkyl ether component selected from the group consisting of the monomethyl, monoethyl, monopropyl and monobutyl ethers, and mixtures thereof, said glycol ether component being present in an amount of about 46% to 150%; drier solids in an amount between about 20% and 40%; inert filler solids in an amount between about 1000% and 1400%; and dissolved water-soluble dyestuff.

12. A combined stain-filler consisting essentially of: a condensation product as claimed in claim 6 and the following materials in percentage by weight on the solids of said condensation product; water in an amount of from about 50% to 100%; an ethylene glycol monoalkyl ether component selected from the group consisting of the monomethyl, monoethyl, monopropyl and monobutyl ethers, and mixtures thereof, said glycol ether component being present in an amount of about 46% to 150%; drier solids in an amount between about 20% and 40%; inert filler solids in an amount between about 1000% and 1400%; and dissolved water-soluble dyestuff.

References Cited in the file of this patent

UNITED STATES PATENTS

| Number | Name | Date |
|---|---|---|
| 2,161,503 | Bush | June 6, 1939 |
| 2,275,843 | Clocker | Mar. 10, 1942 |
| 2,298,914 | Auer | Oct. 13, 1942 |
| 2,338,149 | Walker | Jan. 4, 1944 |
| 2,444,328 | Blair | June 29, 1948 |
| 2,502,606 | Ullmann | Apr. 4, 1950 |
| 2,623,027 | Deniston et al. | Dec. 23, 1952 |
| 2,680,103 | Nack et al. | June 1, 1954 |